Patented Jan. 6, 1931

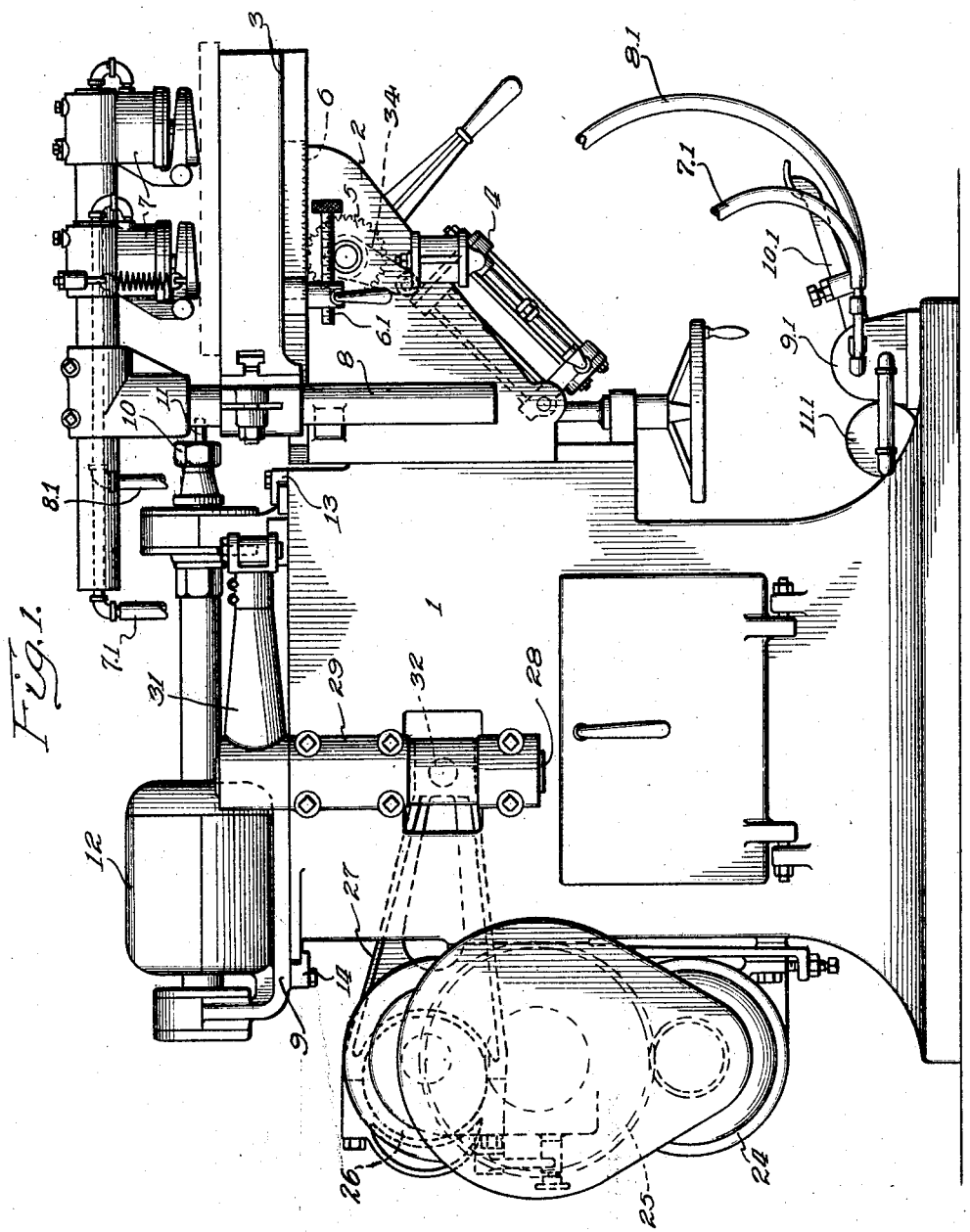

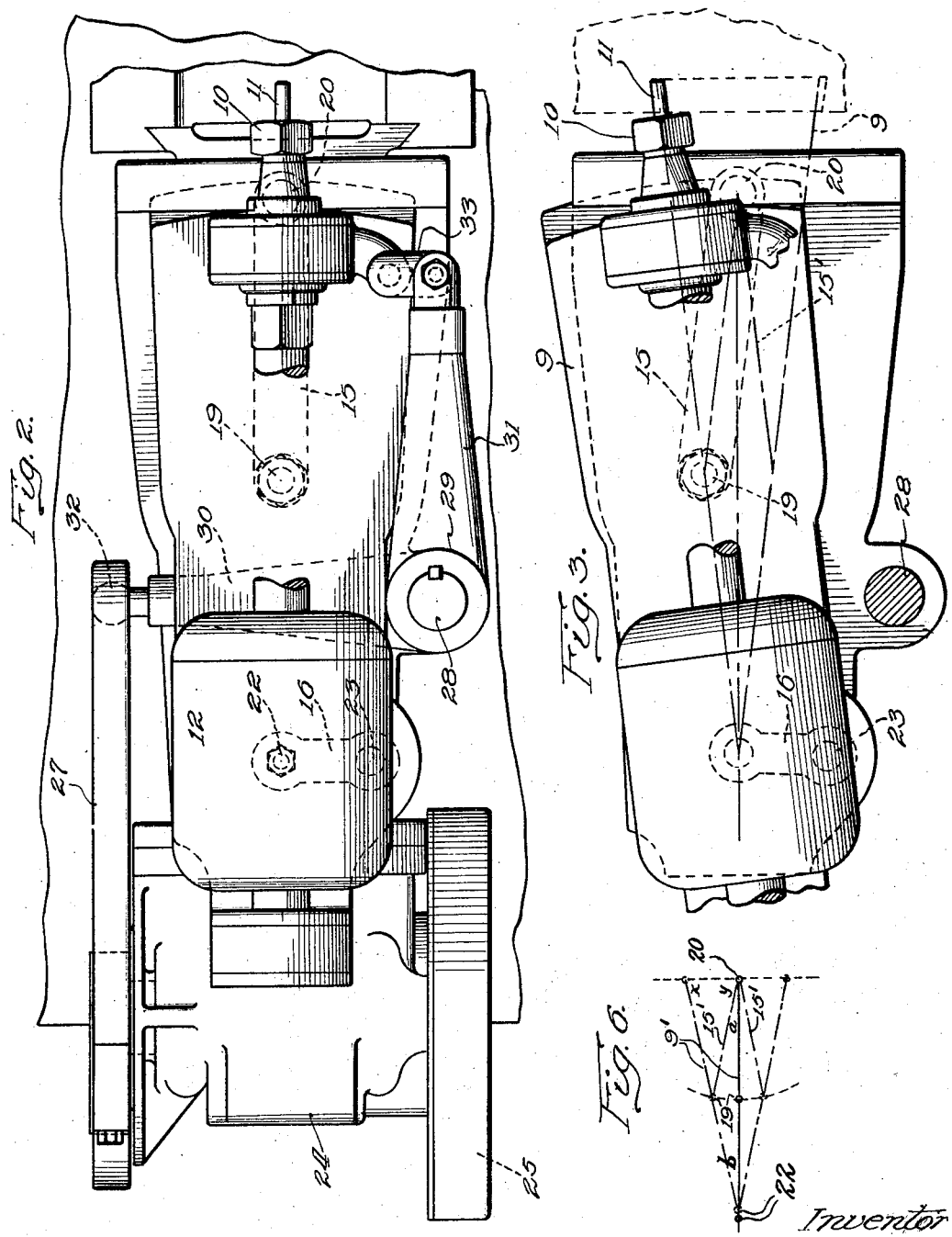

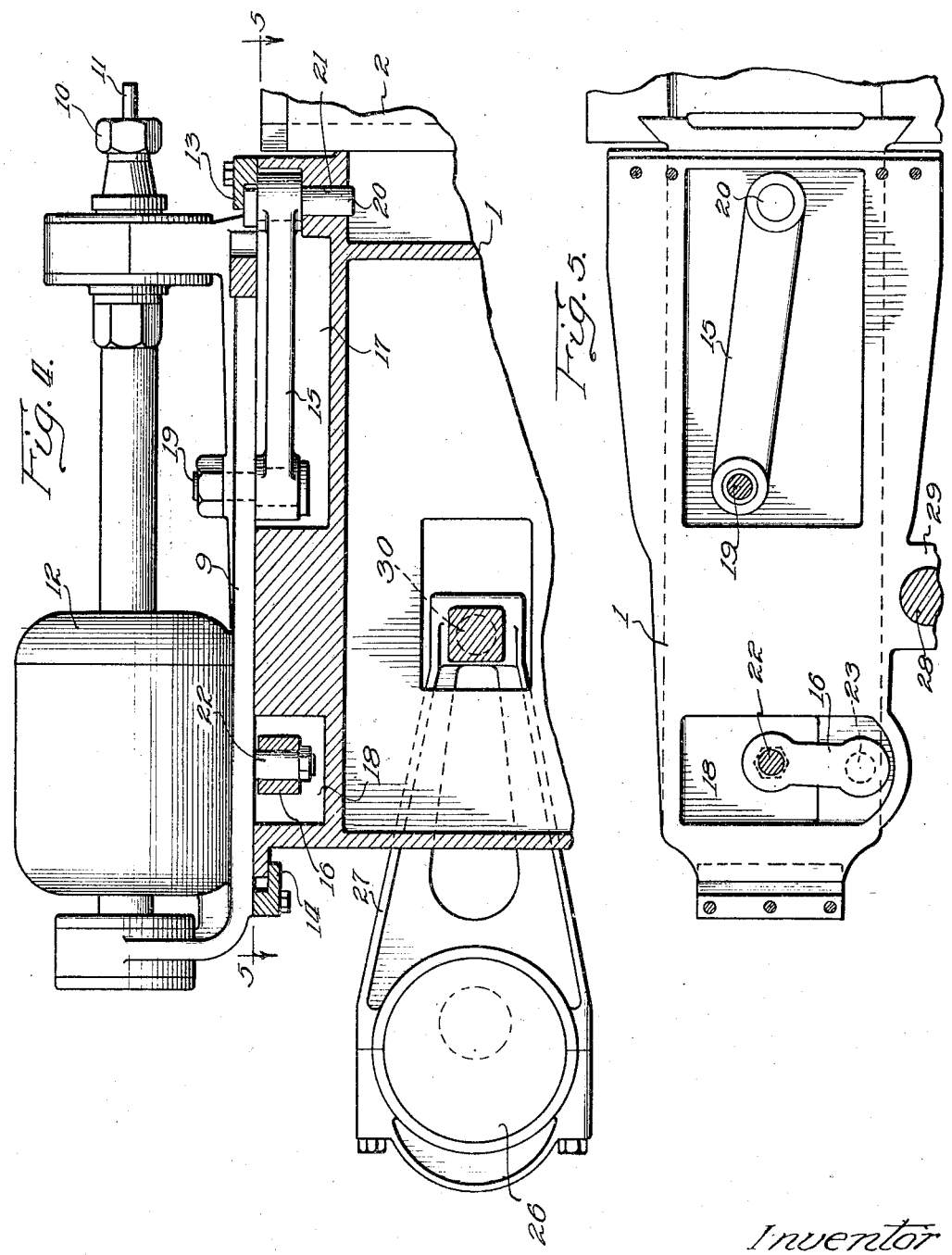

1,787,756

UNITED STATES PATENT OFFICE

OSCAR ONSRUD, OF CHICAGO, ILLINOIS, ASSIGNOR TO ONSRUD MACHINE WORKS, INC., OF CHICAGO, ILLINOIS, A CORPORATION OF ILLINOIS

OSCILLATING BIT MORTISER

Application filed July 22, 1929. Serial No. 380,197.

The main objects of this invention are to provide improved means for guiding the movements of a tool holder of a mortising machine and transversely reciprocating a rotary cutting tool in a substantially straight path; to provide improved means of this kind which will position the cutting tool at diverse angles to the work at opposite ends respectively of the stroke of the tool for forming a recess in the work having under cut ends; to provide improved means for reciprocating a cutting tool holder; to provide an improved arrangement of the reciprocating means on a machine of this kind for obviating interference of the mechanism with curved pieces of work; to provide improved means for uniformly moving work into engagement with a reciprocating cutting tool so as to increase the depth of the cut formed by each successive stroke of the tool; and to provide apparatus for automatically clamping pieces of work on a work support table before they are carried into engagement with the cutting tool and for releasing them after they have been retracted from the tool.

An illustrative embodiment of my invention is shown in the accompanying drawings, in which:

Fig. 1 is a side elevation of a mortising machine embodying my invention.

Fig. 2 is a fragmentary top plan of the mortising machine.

Fig. 3 is a fragmentary top plan showing the position of the tool holder carriage of the machine when the tool is at one end of its stroke.

Fig. 4 is a fragmentary side elevation partly in section showing the guiding means of the tool holder carriage.

Fig. 5 is a fragmentary horizontal section taken on the line 5—5 of Fig. 4.

Fig. 6 is a geometrical diagram for proving that the point of the tool will traverse a straight line in moving laterally.

In the form shown, my improved mortising machine includes a frame or support which has a work supporting bed of the type shown in my copending application Serial No. 380,196, filed July 22, 1929, and a shiftable tool-holder carriage on which is mounted a tool holder having a rotary cutting tool. Mechanism is provided on the other end of the support for reciprocating the carriage and the carriage is connected with the support by guiding apparatus in the form of links which are positioned and proportioned to govern the movements of the carriage so as to cause the cutting point of the tool to move laterally in a substantially straight path.

In the construction illustrated the supporting frame 1 of the mortising machine includes an extension 2 on which a work support table or bed 3 is slidably mounted. Reciprocating mechanism is provided on the extension 2 for moving the bed 3 forwardly and backwardly with respect to the cutting tool. This mechanism comprises a pneumatic jack 4 of the type shown in the said copending application, and a rack and pinion 5 and 6 respectively with which the jack is connected, by a crank 34. The bed 3 carries an adjustable stop 6.1 for limiting its forward stroke and a pair of pneumatic work clamps 7, each mounted on an adjustable standard 8 which is secured to the forward edge of the bed.

The pneumatic clamps 7 and jack 4 are connected by conduits 7.1 and 8.1 with a common control valve 9.1 identical in construction to the control valve illustrated in my said copending application which is designed to apply the clamps to a piece of work on the table 3 immediately before the bed is moved forwardly and to release the clamps after the rearward stroke of the bed. The valve 9.1 is provided with an operating pedal 10.1 comprising a counterweight 11.1.

Shiftably mounted on the top of the frame 1, is a carriage in the form of a platform 9 which includes a tool holder 10, having a cutting tool or bit 11 and an electric motor 12 for rotating the cutting tool. The platform is secured against vertical movement relative to the frame 1 by cleats 13 and 14 and it is pivotally attached to the frame of the machine by links 15 and 16 which are located in recesses 17 and 18 respectively formed in the top of the frame.

The link 15 is secured at its rear end to the intermediate portion of the carriage 9 by a shouldered pivot bolt 19 and the forward end of the link 15 is provided with a pin 20 which is journalled in an aperture 21 formed in the lower wall of the recess 17. The link 16 extends substantially normal to the length of the carriage 9 and is pivotally mounted at one end on a pin 22 which is located on the bottom of the carriage in line with the bolt 19 and pin 20 and at a distance from the bolt 19 substantially equal to the length of the link 15.

The other end of the link 16 is provided with a pin 23 which is also journaled in an aperture formed in the frame 1. The movement of the platform is guided by the links 15 and 16 in such a manner as to retain the cutting tool 11 in a substantially straight path and to incline the tool at diverse angles at opposite ends respectively of the stroke of the tool.

Geometric proof that straight line motion is produced by the construction described may be seen in Fig. 6 wherein the line 9' represents that portion of the carriage which extends between the pin 22 and the pin 20 and the dotted lines 15' which are one-half the length of line 9' represent the positions of the link 15 when the carriage is at any point outside of the middle of its stroke.

The line between 19 and 20 in Fig. 6 is equal in length to the line 15' and as the point 20 remains on the normal a triangle is formed having equal angles $a$ and $b$. The line 15' is also equal in length to the remaining portion (half) of line 9' and therefore a second triangle having equal angles $x$ and $y$ is formed. These two isosceles triangles make up a third triangle the sum of whose three angles $x$, $b$ and $(y+a)$ necessarily equal 180°. Therefore:

$$y+a = 180° - (x+b) = 180° - x - b.$$

By substituting $y$ for its equal $x$, and $(a)$ for its equal $b$:

$$y+a = 180° - y - a;$$

therefore $y+a = 90°$.

This proves the line which represents the path of the end of line 9' (corresponding to the path of the end of the cutting tool), is perpendicular to the line through points 20 and 22 and is accordingly a straight line.

In the construction shown the travel of the pivot 22 is very slight and practically coincident with the normal to the path of the tool. The cutting tool actually extends slightly beyond the pin 20 but this overhang is so slight compared to its distance from the point 22 that the path of the tool point is also practically a straight line.

The mechanism that oscillates the carriage is mounted on the front end of the frame 1 and comprises an electric motor 24, a train of gears 25, and an eccentric driving member 26 which is connected with the carriage 9 by a connecting rod 27 and a bell-crank 28. The bell-crank 28 is journaled in a bearing 29 on the side of the frame 1 and has a lower arm 30 extending transversely through a passage formed in the frame 1 and an upper arm 31 which extends rearwardly in the direction of the length of the frame. The lower arm 30 is secured to the rear end of the connecting rod 27 by a ball joint 32 and the upper arm 31 is connected with the carriage 9 by a link 33.

The operation of the machine is as follows:

The cutting tool or bit 11 is continuously rotated by the motor 12 and it is continuously oscillated by the bell crank 28 which is driven by the motor 24.

As the carriage 9 is oscillated the pin 22 at the front end of the carriage travels approximately on a straight line which passes through the centers of the crank shaft 20 and pin 22. Those portions of the rear end of the carriage which are at a distance from the pin 22 substantially equal to twice the length of the link 15 are moved in a straight line which is perpendicular to the theoretical straight line upon which the pin 22 travels. The cutting tool 11 is located approximately at that part of the rear end of the carriage which moves in a straight path and thus the action of the links 15 and 16 upon the carriage confines the cutting tool to a substantially straight course.

These links also position the tool 11 at diverse angles at opposite ends respectively of its stroke.

The work to be operated upon is placed upon the bed 3 and positioned under the clamps 7 and when the operating pedal 10.1 is depressed the clamps firmly secure the work on the bed which is subsequently moved towards the tool 11 by the jack 4. The tool 11 bores its way into the work as the bed advances and each stroke of the tool forms a substantially straight cut in the work. The depth of each cut can be predetermined by varying the rate of oscillation of the tool. The length of the cut may be varied by changing the relation of the connecting rod 27 with respect to the eccentric driving member 26. The final depth of the resulting recess may be predetermined by setting the adjustable stop 6.1. The diverse angular positions of the bit at the opposite ends of its stroke produces undercut extremities on the recess formed which permit convenient squaring up of the ends of the recess by a chiseling operation.

The bed 3 may be retracted at any time by releasing the pedal 10.1 and allowing it to be moved to its initial position by the counterweight 11.1. This action causes the jack 4 to move the bed to its rearward position and it subsequently releases the clamps 7.

Although but one specific embodiment of this invention has been herein shown and described, it will be understood that various details of the construction shown may be altered or omitted without departing from the spirit of this invention as defined by the following claims.

I claim:

1. A mortising machine comprising a support, a carriage mounted on said support comprising a tool holder having a cutting tool thereon, mechanism on said support for oscillating said carriage, a pair of links each pivotally attached at one end to said support and at the other end to said carriage, one of said links extending along the carriage and the other at right angles thereto for retaining said cutting tool in an approximately straight course during oscillation of said carriage, a work support table slidably mounted on said frame, and means for reciprocating said table toward and away from said cutting tool.

2. A mortising machine comprising a support, a platform slidably mounted on said support, means on said support for preventing vertical displacement of said platform relative to said support, a link pivotally secured at one end to said support and at its other end to said platform, means for swinging said platform relative to said support, a cutting tool on one end of said platform, means on the other end of said platform for guiding the movements of said platform to retain said tool in an approximately straight course, and means for moving work into engagement with said tool while said platform is in motion to produce a substantially straight line cut in said work.

3. A mortising machine comprising a support, a carriage shiftably and pivotally mounted at one end on said support, a tool holder on the other end of said support having a cutting tool, means for oscillating said carriage, and a link pivotally attached at one end to the center of said carriage and journaled at its other end on said support substantially at the middle position of the cutting end of said tool for guiding the movements of the cutting end of said tool along an approximate tangent to the arc through which said carriage oscillates.

4. A mortising machine comprising a support, a carriage mounted on said support comprising a tool holder and a motor for rotating said tool holder, mechanism on said support for oscillating said carriage, and a pair of links each pivoted at one end to said support and at the other end to said carriage, said links being spaced apart longitudinally of the carriage and extending at an angle to each other.

Signed at Chicago this 18th day of July, 1929.

OSCAR ONSRUD.